Figures 1, 2, 3:
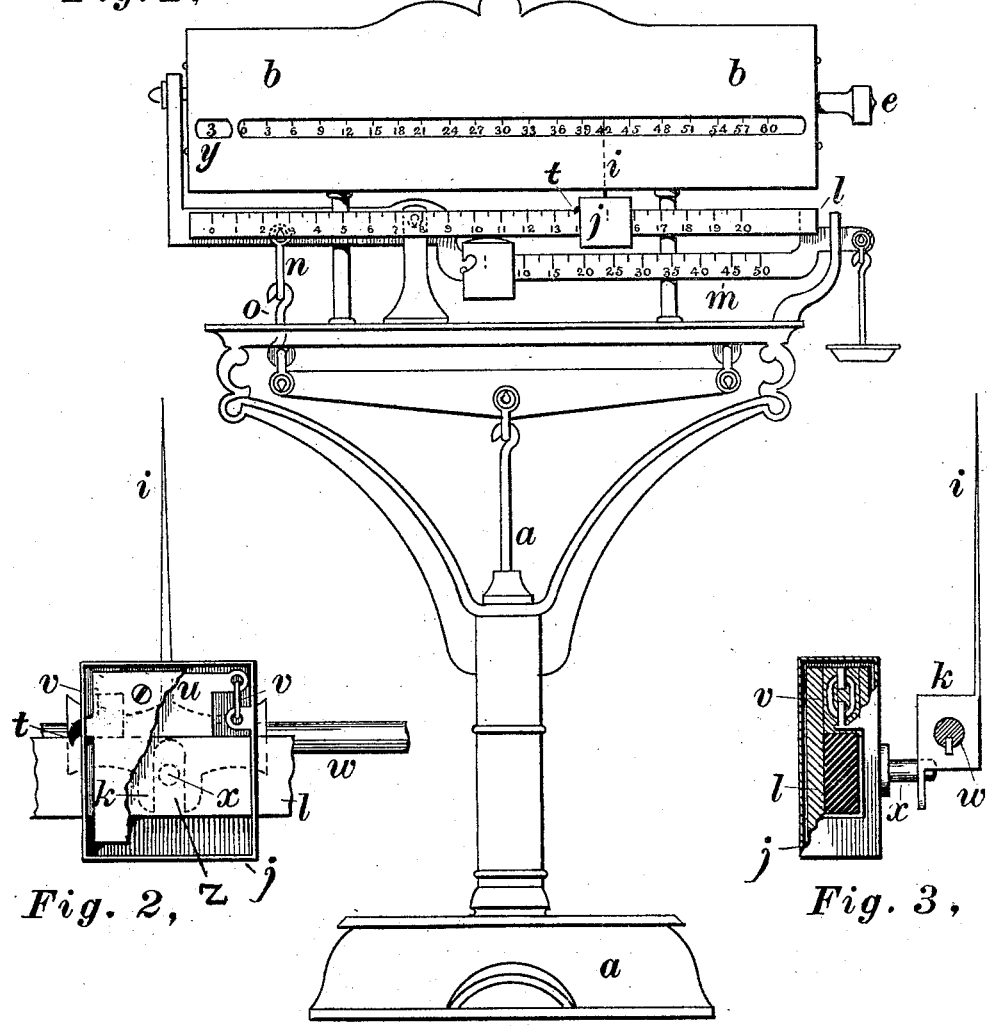

(No Model.) 2 Sheets—Sheet 1.

H. PADDOCK & O. B. JOHNSON.
COMPUTING SCALE.

No. 528,793. Patented Nov. 6, 1894.

Witnesses,
Gales P. Moore,
W. H. Bentley.

Inventors,
Hardin Paddock
Orville B. Johnson
By Chas. S. Sturtevant.
Atty.

THE NORRIS PETERS CO., PHOTO-LITHO., WASHINGTON, D. C.

(No Model.) 2 Sheets—Sheet 2.
H. PADDOCK & O. B. JOHNSON.
COMPUTING SCALE.
No. 528,793. Patented Nov. 6, 1894.
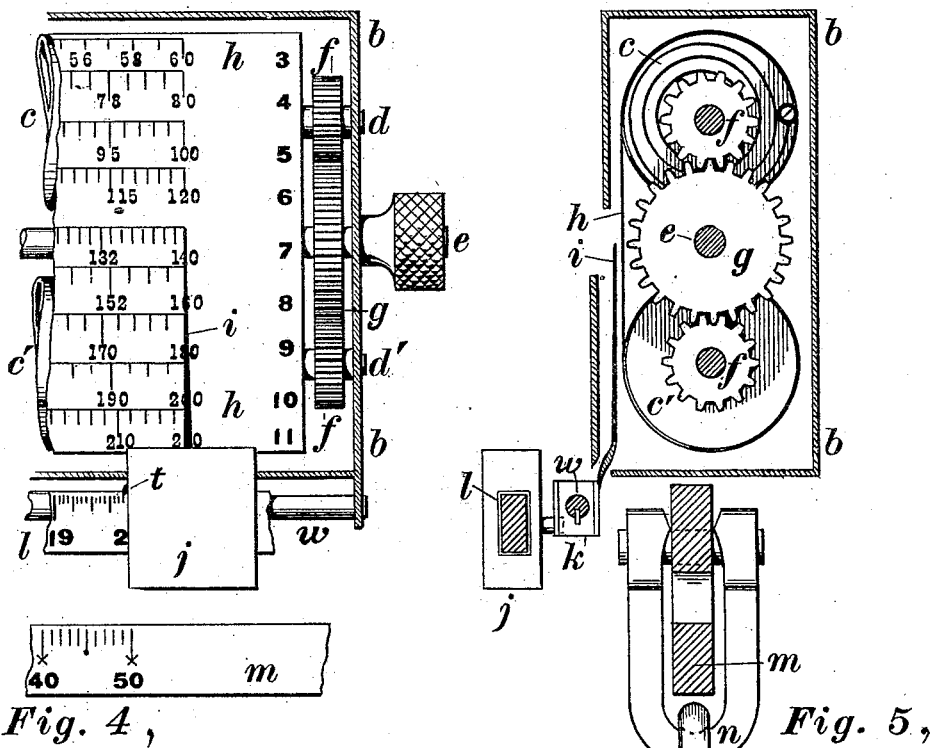
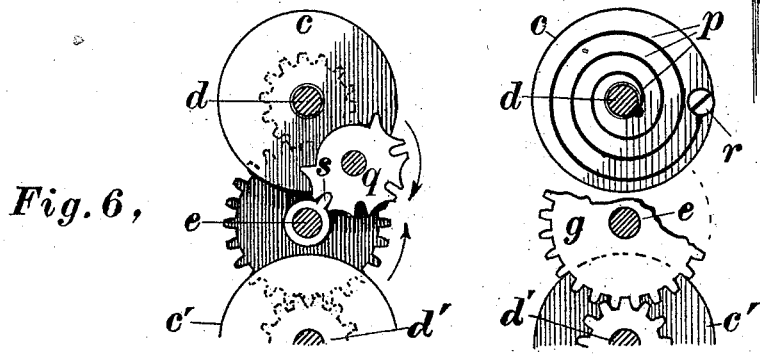
Witnesses,
Gales P. Moore
W. H. Bentley
Inventors,
Harvlin Paddock
Orville B Johnson
By Chas. S. Sturtevant,
atty.

UNITED STATES PATENT OFFICE.

HARVLIN PADDOCK AND ORVILLE B. JOHNSON, OF ST. JOHNSBURY, VERMONT, ASSIGNORS TO THE E. & T. FAIRBANKS & COMPANY, OF VERMONT.

COMPUTING-SCALE.

SPECIFICATION forming part of Letters Patent No. 528,793, dated November 6, 1894.

Application filed June 9, 1894. Serial No. 514,112. (No model.)

*To all whom it may concern:*

Be it known that we, HARVLIN PADDOCK and ORVILLE B. JOHNSON, citizens of the United States, residing at St. Johnsbury, in the county of Caledonia, State of Vermont, have invented certain new and useful Improvements in Computing-Scales, of which the following is a description, reference being had to the accompanying drawings, and to the letters of reference marked thereon.

Our invention relates to an improvement in scales, and particularly to that class known as computing scales in which the weight and value of an article at a given price per pound, or the quantity of a commodity at a given rate which can be sold for a certain sum, can be ascertained without requiring any laborious computations, the action of weighing bringing into operation indicating devices which give the information desired.

We are aware that it has been proposed heretofore to operate an indicator by direct connection with a scale poise and also that it is old to construct a poise provided with rollers adapted to travel on the beam, a friction roller extending loosely into a slot formed in said poise, and a slide carrying the friction roller and adapted to move in line with the beam.

The object of our invention in addition to that common to all computing scales is to provide such an arrangement that although an indicating mechanism external to the scale is operated by the movement of the poise along the beam and in perfect accord therewith whenever the latter is moved, nevertheless when the poise is at rest all connection between the same and the indicating mechanism is at rest also, so that the scale beam is left entirely free from any incumbrance.

The invention therefore consists in the matters hereinafter described and referred to in the appended claims.

In the drawings which illustrate our invention Figure 1 is an elevation of our improved scale. Fig. 2 is a front view of the sliding poise and casing, part being broken away. Fig. 3 is a sectional side view of Fig. 2. Fig. 4 is a front view enlarged of so much of the computing mechanism as is essential to a correct understanding of our invention. Fig. 5 is an end view of the device, part being shown in section; and Figs. 6 and 7 are detail views showing the rollers for winding the charts.

In the drawings, the ordinary platform scale of the counter variety is shown at $a$ and is connected with the beam by the loops $n$ and rod $o$. The beam is double, the part $m$ being provided with a poise and being adapted for use in the ordinary way. The part $l$ of the beam is provided with weighing poise $j$ which is of peculiar and original construction, consisting of the outer casing and the inner poise proper $u$ which rests on the beam. The poise $u$ serves to support the casing by means of the links $v$ $v$ attached to said poise and to lugs on the casing, so that said casing can swing freely a short distance toward either end of the beam, the holes where the beam passes through the casing being somewhat larger than the beam.

It will be noticed that the case is slightly larger than the poise proper $u$, so that when the case is pushed either way it will move a short distance before moving the poise at all and as soon as the casing is left to itself it will automatically settle into its original position, and hang clear of the sliding poise at all times except when the poise is being moved along the beam. Directly back of the graduated beam $l$ is a rod $w$ upon which is splined a slide $k$ provided with a pointer $i$. The slide has a depending lower part in which is formed a slot $z$ into which projects a rod or pin $x$ secured to the casing $j$ so that when the casing is moved along on the beam, the pin $x$ will engage the sides of the slot in the slide $k$ and move the latter with its pointer $i$ to its desired position and we prefer to leave the same space or clearance on either side of the pin $x$ in the slot $z$ as the poise $u$ has in the case $j$ so that when casing $j$ is moved along the beam it will begin to move the sliding poise $u$ at the same time that the pin $x$ begins to move the indicating slide so that the movements of the poise $u$ and the indicating slide $k$ will always correspond. When the case $j$ reaches the desired position and the hand of the operator is removed the pin $x$ will settle in the middle of the slot by means of the links $v$, $v$, so that beam $l$ may play up and down entirely clear of the indicating mechanism, so that the latter offers no incumbrance to the action of said beam being automatically disconnected therefrom when the poise is at rest. A pointer $t$ is fixed to the sliding poise $u$ and extends out through the end of the case $j$ so that the position of the poise $u$ can be read at any time, whether the case $j$ has come to rest or not.

In Fig. 5 is shown a case $b, b$, containing two rollers $c$ and $c'$ so that a sheet of paper may be unwound from one and wound onto the other. To turn these rollers we have provided pinions $f, f$, which may be revolved by an intermediate gear $g$ by means of the thumb piece $e$. To keep the paper $h$ always taut as it unwinds from one roller and winds onto the other, we propose to fasten roller $c'$ to its shaft $d'$, as shown in Fig. 7, while the roller $c$ is free to revolve on its shaft $d$. A clock spring $p$ has one end fastened to the shaft $d$ and the other end to the end of the roller $c$. The tension of the spring will thus take up the slack of the paper. To prevent the rollers from turning beyond the end of the paper, we employ the familiar watchmaker's stop $q$ shown in Fig. 6. At each revolution of the shaft $e$ the lug $s$ engages a notch in stop $q$ and turning the stop until the lug brings up on the blank part of $q$ allowing it to turn no farther.

The weighing beam $l$ is divided to represent pounds by any desired divisions, as twenty pounds by one ounce marks. The paper $h$ is correspondingly divided, not into pounds but into prices representing the value of each pound or fraction thereof at many different rates, as 1 ct. per lb., 15 cts. per lb., &c., for each pound or fraction up to twenty pounds. Fractions of a cent can be introduced if desired, as $12\frac{1}{2}$ cts., and the marking price can be continued to any desired extent, being limited only by a convenient length of paper.

The action of the scale in practice is as follows: By the thumb piece $e$ the paper table is revolved until the desired price, say 3 cts., appears through the slot $y$. The article to be weighed being placed on the platform, the poise $j$ is moved along until the beam balances, as at 14 lbs., when the indicator $i$ points to the value 42 cts.; or, if fifty cents' worth of goods at eight cents per pound is ordered, the price table is set at 8 and the indicator at 50, when the beam $l$ will read at 6 lbs., 4 oz., and goods enough to balance the scale are put on the platform.

It will be seen that the great advantage of our invention lies in the fact that when the poise has been placed in proper position all connection with the indicating slide is broken. Various minor modifications and changes in the construction of the parts of our mechanism may be made without departing from the spirit of our invention.

Having thus described our invention, what we claim, and desire to secure by Letters Patent, is—

1. In a scale in combination with the beam, a sliding poise, a sliding indicator with connections between the poise and indicator, said connections including a part capable of limited movement independent of the poise, but by which the poise is moved along the beam, substantially as described.

2. In a scale in combination with the beam a sliding poise, a casing loosely supported thereon a sliding indicator with a normally broken connection between the same and the casing; substantially as described.

3. In a scale in combination with the beam a sliding poise a casing loosely supported thereon and having a slight clearance between the poise and the casing, a pin projecting from the casing an indicator having a slot into which said pin projects and has a clearance substantially the same as that between the poise and its casing; substantially as described.

4. The herein described poise comprising the central portion adapted to slide on the beam and having a surrounding casing supported thereon and having a slight swinging movement independent of said central portion; substantially as described.

5. The herein described poise comprising the central portion adapted to slide on the beam and having a surrounding casing supported thereon and having a slight swinging movement independent of said central portion, said central portion having a pointer, whereby the position of the poise may be read at any time, whether the casing has come to rest or not; substantially as described.

6. In a scale in combination with the beam a poise sliding thereon having a portion capable of limited swinging movement, a sliding indicator and a connection between the swinging portion of the poise and the indicator; substantially as described.

7. In a scale, a beam, a poise sliding thereon, a casing loosely supported on said poise by suitable links as $v$, an indicator, and connections between the indicator and the casing; substantially as described.

8. In a scale, a beam, a poise sliding thereon, a part capable of limited movement independent of the poise, but adapted when the limit of that movement is reached to cause the poise to operate, and connections between said movable part and said indicator; substantially as described.

9. In a scale, a beam, a poise sliding thereon, a part capable of limited movement independent of the poise, but adapted when the limit of that movement is reached to cause the poise to operate, a pin projecting from said part, and an indicator provided with a slot with which said pin loosely engages; substantially as described.

10. In a scale, a beam, the poise $u$, the casing loosely supported thereon by the links $v$, the pin $x$, the indicating slide $k$ having the slot $z$ into which the pin $x$ projects, substantially as described.

11. In a scale, a beam, the poise $u$ with the pointer $t$, the casing, the links $v$ supporting the same, the rod $w$, the indicating slide thereon provided with the slot, the pin $x$ secured to the casing and extending into the slot, the casing and pin being capable of limited movement before binding on the poise and slide respectively, substantially as described.

12. In combination with the poise and indicator, the chart $h$ graduated as shown and trained on the rollers $c$, $c'$, the gears and thumb piece, the shaft provided with the lugs $s$, and the stop $q$ provided with notches; substantially as described.

In testimony whereof we affix our signatures in presence of two witnesses.

HARVLIN PADDOCK.
    ORVILLE B. JOHNSON.

Witnesses:
 J. C. CLARK,
 WM. C. TYLER.